UNITED STATES PATENT OFFICE.

NOAH LEVERING, OF LOS ANGELES, CALIFORNIA, AND MARY ELIZBETH CURRY, OF PACIFIC, MISSOURI.

MEDICAL COMPOUND.

SPECIFICATION forming part of Letters Patent No. 400,577, dated April 2, 1889.

Application filed January 12, 1887. Serial No. 224,146. (No specimens.)

*To all whom it may concern:*

Be it known that we, NOAH LEVERING and MARY ELIZBETH CURRY, citizens of the United States, residing respectively at Los Angeles, in the county of Los Angeles and State of California, and at Pacific, in the county of Franklin and State of Missouri, have invented a new and useful Composition of Matter to be used as a Remedy for Consumption in its early stages, Coughs, Colds, Sore Throat, and similar Afflictions, of which the following is a specification.

Our composition consists of the following ingredients, combined in the proportions stated, viz: berries of the *Schinus molle* or pepper-tree, one and one-half pint; honey, (preferably that made from *Schinus molle* or from the white or black sage,) one gallon; alcohol, one quart; glycerine, one pint; water, one pint; alum, (pulverized,) one tea-spoonful.

Compounded as follows: Bring the honey to a boiling-heat. Pulverize one pint of the berries and put in the alcohol. Let stand fifteen days. Pulverize one-half pint of the berries and steep twenty minutes. Strain, rinse the berries in one pint of water, squeeze dry, strain water, and mix with honey. Add alcohol, glycerine, and pulverized alum. Bottle, and stir while bottling. Doses: One tea-spoonful to one table-spoonful three times a day before eating.

We are aware that compositions consisting of honey and pepper are in common use and are referred to in "Gunn's Family Physician," 1864, p. 774, and in "Our Family Physician," 1869, pp. 200 and 207; but we are not aware that a composition consisting of *Schinus molle* or sage-honey and the berries of the *Schinus molle* tree have ever been used in the manner set forth in this specification.

What we claim, and desire to secure by Letters Patent of the United States, is—

The herein-described composition of matter to be used as a remedy for consumption in its early stages, coughs, colds, sore throat, and similar afflictions, consisting of honey, *Schinus molle* or pepper-tree berries, alcohol, glycerine, water, and alum, in the proportions specified.

NOAH LEVERING.
MARY ELIZBETH CURRY.

Witnesses:
RICHARD R. TANNER,
M. K. BANETTO,
LOUIS H. COON.